(12) United States Patent
Parker

(10) Patent No.: US 10,359,071 B2
(45) Date of Patent: Jul. 23, 2019

(54) SOCKET ASSEMBLY AND METHOD OF MAKING

(71) Applicant: Federal-Mogul Motorparts Corporation, Southfield, MI (US)

(72) Inventor: Glen C. Parker, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 216 days.

(21) Appl. No.: 15/629,209

(22) Filed: Jun. 21, 2017

(65) Prior Publication Data

US 2018/0135691 A1   May 17, 2018

Related U.S. Application Data

(60) Provisional application No. 62/422,682, filed on Nov. 16, 2016.

(51) Int. Cl.
*F16C 11/06* (2006.01)
*F16C 11/08* (2006.01)

(52) U.S. Cl.
CPC ........ *F16C 11/0671* (2013.01); *F16C 11/069* (2013.01); *F16C 11/086* (2013.01); *F16C 11/068* (2013.01); *F16C 11/0628* (2013.01); *F16C 11/0695* (2013.01); *F16C 2326/05* (2013.01); *F16C 2326/24* (2013.01)

(58) Field of Classification Search
CPC ......... Y10T 403/315; Y10T 403/32729; F16C 11/0671; B60G 7/005
See application file for complete search history.

(56) References Cited

U.S. PATENT DOCUMENTS

| 3,322,445 | A | * | 5/1967 | Hassan | F16C 11/0671 |
| | | | | | 277/635 |
| 4,322,175 | A | * | 3/1982 | Szczesny | F16B 21/20 |
| | | | | | 277/635 |
| 4,580,921 | A | * | 4/1986 | Broszat | F16C 11/06 |
| | | | | | 277/635 |
| 5,066,159 | A | | 11/1991 | Urbach | |

(Continued)

FOREIGN PATENT DOCUMENTS

GB   1447412 A   8/1976

OTHER PUBLICATIONS

International Search Report, dated Jan. 3, 2018 (PCT/US2017/061220).

*Primary Examiner* — Daniel J Wiley
(74) *Attorney, Agent, or Firm* — Robert L. Stearns; Dickinson Wright, PLLC

(57) ABSTRACT

The socket assembly includes a housing with an inner bore and a stud with a first portion and a shank portion. The first portion is disposed in the inner bore of the housing, and the shank portion extends out of the inner bore. The socket assembly further includes a boot with a boot body that extends from a first boot end to a second boot end. The first boot end is received in the inner bore of the housing and is operatively sealed with the housing. The second boot end is operatively sealed with the ball stud. The boot further includes an insert that is in an overmolding engagement with the first boot end. The insert has a plurality of raised sections and a plurality of recessed sections and has a plurality of vertical sections that interconnect adjacent ones of the raised and recessed sections.

15 Claims, 5 Drawing Sheets

(56) References Cited

U.S. PATENT DOCUMENTS

| | | | | |
|---|---|---|---|---|
| 5,163,692 | A * | 11/1992 | Schofield | F16J 15/3236 |
| | | | | 277/436 |
| 5,466,084 | A * | 11/1995 | Brueggen | F16C 11/0671 |
| | | | | 277/635 |
| 5,649,779 | A * | 7/1997 | Martin | F16C 11/0671 |
| | | | | 277/635 |
| 6,834,863 | B2 * | 12/2004 | Urbach | F16C 11/0671 |
| | | | | 277/555 |
| 7,670,078 | B2 * | 3/2010 | Elterman | F16C 11/0671 |
| | | | | 277/635 |
| 7,931,279 | B2 * | 4/2011 | Niwa | F16J 3/042 |
| | | | | 277/630 |
| 7,980,564 | B2 * | 7/2011 | Niwa | F16C 11/0671 |
| | | | | 277/634 |
| 9,771,971 | B1 * | 9/2017 | Winter | B60G 7/005 |
| 2009/0209353 | A1 * | 8/2009 | Abels | B29C 45/2612 |
| | | | | 464/106 |

* cited by examiner

SOCKET ASSEMBLY AND METHOD OF MAKING

CROSS-REFERENCE TO RELATED APPLICATION

This application claims the benefit of U.S. Provisional Patent Application Ser. No. 62/422,682, filed Nov. 16, 2016, entitled "Alternating Step Insert for Dust Boots", the entire disclosure of the application being considered part of the disclosure of this application and hereby incorporated by reference.

BACKGROUND OF THE INVENTION

1. Field of the Invention

The present invention is related generally to socket assemblies and, more particularly, to boots for socket assemblies.

2. Related Art

Automobile steering and suspension systems typically include two or more ball socket assemblies which operably connect a steering knuckle with one or more control arms and with a tie rod. Each of these ball socket assemblies includes a housing and a ball stud that are articulatable relative to one another during operation of the vehicle and that are sealed together by a dust boot to keep a lubricating agent (such as grease) inside the socket assembly and to keep contaminants out. The dust boots is made of an elastomeric material, such as rubber or a rubber-like material, so that it can flex to maintain the seals with the housing and stud as these components articulate relative to one another.

In some socket assemblies, the dust boot is sealed against an outer surface of the housing with the assistance of a retention device, which may either be molded into the elastomeric boot material or pressed against an outer circumference of the dust boot. Such dust boots can only be installed onto the housing at the end of an assembly process and rely on the retaining devices to keep the boots in place and maintain the seal between the boot and the bearing.

In other socket assemblies, a flange at one end of the dust boot is inserted into an inner bore of the housing prior to closure. A cover plate is then placed above a flange on the dust boot, and the housing material is then deformed to capture both the cover plate and the flange of the dust boot in the interior. Such dust boots typically also include a plastic or metal insert which is molded into or bonded with the elastic boot material to maintain the seal between the boot and the housing and to protect the boot from damage when the housing is deformed. In the case of molding a plastic insert with the boot material, for this process to work, the insert and boot materials must have similar melting points. When bonding metal inserts with the elastic boot material, special bonding agents or processes are required which may increase the total cost of the socket assembly. Even with an insert, regardless of which material it is made of and how it is attached with the elastic boot material, care must be taken to avoid damaging the elastic boot material from damage during the deformation process.

SUMMARY OF THE INVENTION

One aspect of the present invention is related to an improved socket assembly. The socket assembly includes a housing with an inner bore which extends along a central axis. The socket assembly also includes a stud with a first portion and a shank portion. The first portion is disposed in the inner bore of the housing, and the shank portion extends out of the inner bore through an open end of the housing. The socket assembly further includes a boot with a boot body that is made of an elastomeric material and that extends from a first boot end to a second boot end. The first boot end is received in the inner bore of the housing and is operatively sealed with the housing. The second boot end is operatively sealed with the shank portion of the ball stud. The boot further includes an insert that is in an overmolding engagement with the first boot end of the elastomeric boot body. The insert has a plurality of raised sections that are spaced from one another in a circumferential direction by a plurality of recessed sections and has a plurality of vertical sections that interconnect adjacent ones of the raised and recessed sections.

The insert with the raised, recessed and vertical sections provides a more durable and long lasting fluid-tight seal between the elastomeric boot body and the housing. It also allows for the housing to be deformed or swaged directly into contact with the elastomeric boot body without damaging the elastomeric boot body during this operation. As such, no cover plate is necessary to protect the elastomeric boot body from the deformed housing, and no adhesives or bonding operations are necessary to join the cover plate with the boot.

According to another aspect of the present invention, the open end of the housing presents a radially inwardly extending lip that captures the first portion of the stud and the first boot end of the boot body within the inner bore of the housing.

According to yet another aspect of the present invention, at least one bearing is disposed in the inner bore of the housing, and the elastomeric boot body is in surface-to-surface contact with an end face of the at least one bearing to establish a primary seal between the boot and the housing.

According to still another aspect of the present invention, the elastomeric material of the boot body is in surface-to-surface contact with the lip of the housing to establish a secondary seal between the boot and the housing.

According to a further aspect of the present invention, the radially inwardly extending lip is bent into the housing.

According to yet a further aspect of the present invention, the vertical sections extend at obtuse angles relative to the raised and recessed sections.

According to still a further aspect of the present invention, the raised sections of the insert lie in a common first plane, and the recessed sections of the insert lie in a common second plane that is spaced axially from the common first plane.

According to another aspect of the present invention, the insert is made of metal.

Another aspect of the present invention is related to a method of making a socket assembly. The method includes the step of preparing an insert with a plurality of raised sections that are spaced circumferentially from one another by a plurality of recessed sections and with a plurality of vertical sections that interconnect adjacent ones of the raised and recessed sections. The method continues with the step of molding a first boot end of a boot body out of an elastomeric material around at least a portion of the insert wherein the boot body extends from the first boot end to a second boot end. The method proceeds with the step of inserting a first portion of a stud into an inner bore of a housing such that a shank portion of the stud extends out of the inner bore through an open end of the housing. The method continues with the step of inserting the first boot end of the boot body into the inner bore of the housing through the open end. The method proceeds with the step of sealing the first boot end of the boot body with an inner surface of the housing. The method continues with the step of sealing the second boot end of the boot body with the shank portion of the housing.

According to another aspect of the present invention, the step of sealing the first boot end of the boot body with the inner surface of the housing is further defined as bending an edge of the housing radially inwardly to present a radially inwardly extending lip which overlies the first boot end of the boot body to capture the first boot end of the boot body and the first portion of the stud in the inner bore of the housing.

According to yet another aspect of the present invention, the method further includes the step of inserting at least one bearing into the inner bore of the housing.

According to still another aspect of the present invention, the method further includes the step of sealing the first boot end of the boot body with an end face of the at least one bearing.

According to a further aspect of the present invention, the method further includes the step of establishing surface-to-surface contact between the first boot end of the boot body and the lip of the housing and between the first boot end of the boot body and the end face of the at least one bearing.

According to yet a further aspect of the present invention, the vertical sections of the insert extend at obtuse angles relative to the raised and recessed sections.

According to still a further aspect of the present invention, the raised sections of the insert lie in a common first plane, and the recessed sections of the insert lie in a common second plane that is spaced axially from the common first plane.

BRIEF DESCRIPTION OF THE DRAWINGS

These and other features and advantages of the present invention will be readily appreciated as the same becomes better understood by reference to the following detailed description when considered in connection with the accompanying drawings, wherein.

DESCRIPTION OF THE ENABLING EMBODIMENT

Figure 1:
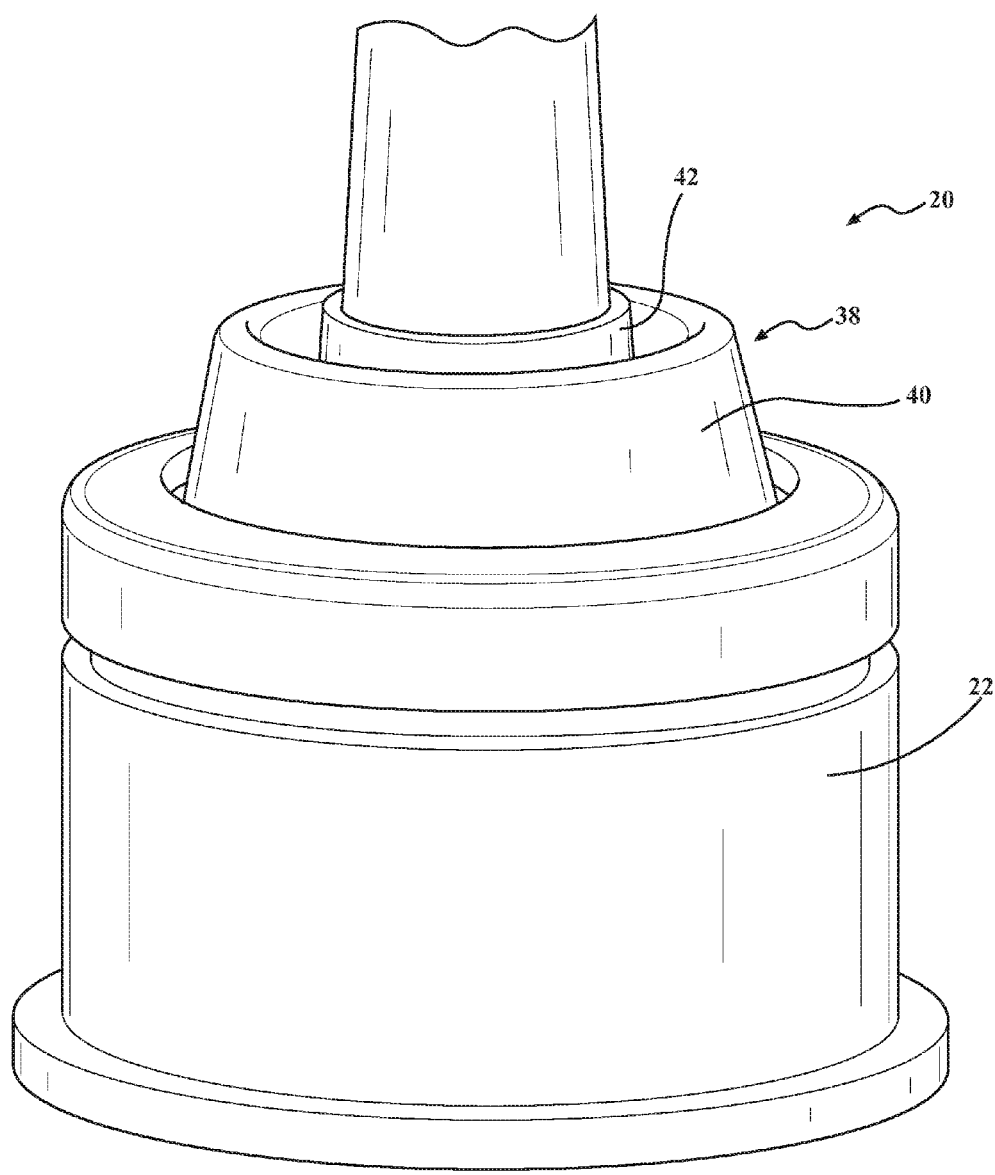
FIG. 1 is a front elevation view of a socket assembly constructed according to one aspect of the present invention.
Figure 2:
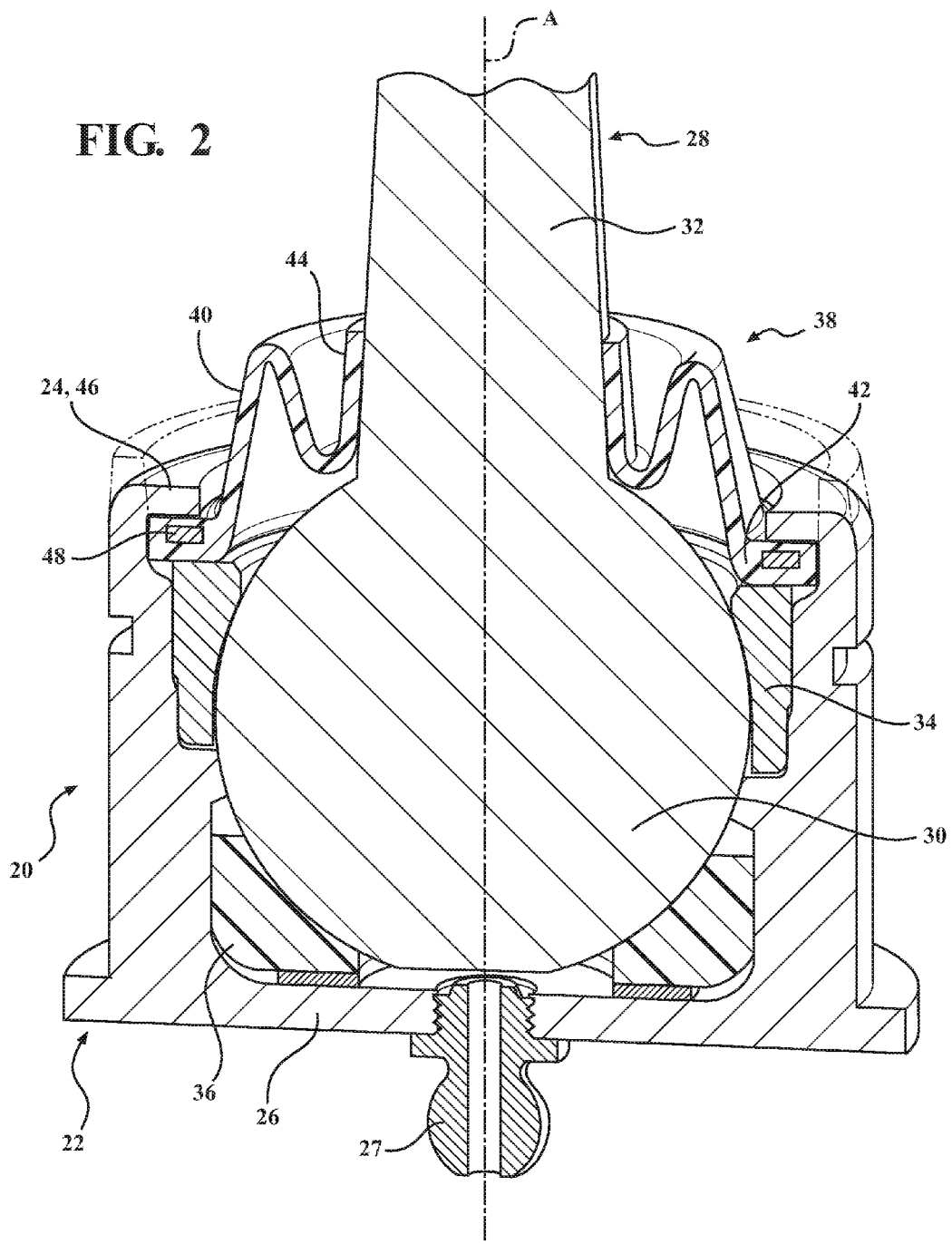
FIG. 2 is a cross-sectional view of the socket assembly of FIG. 1.
Figure 3:
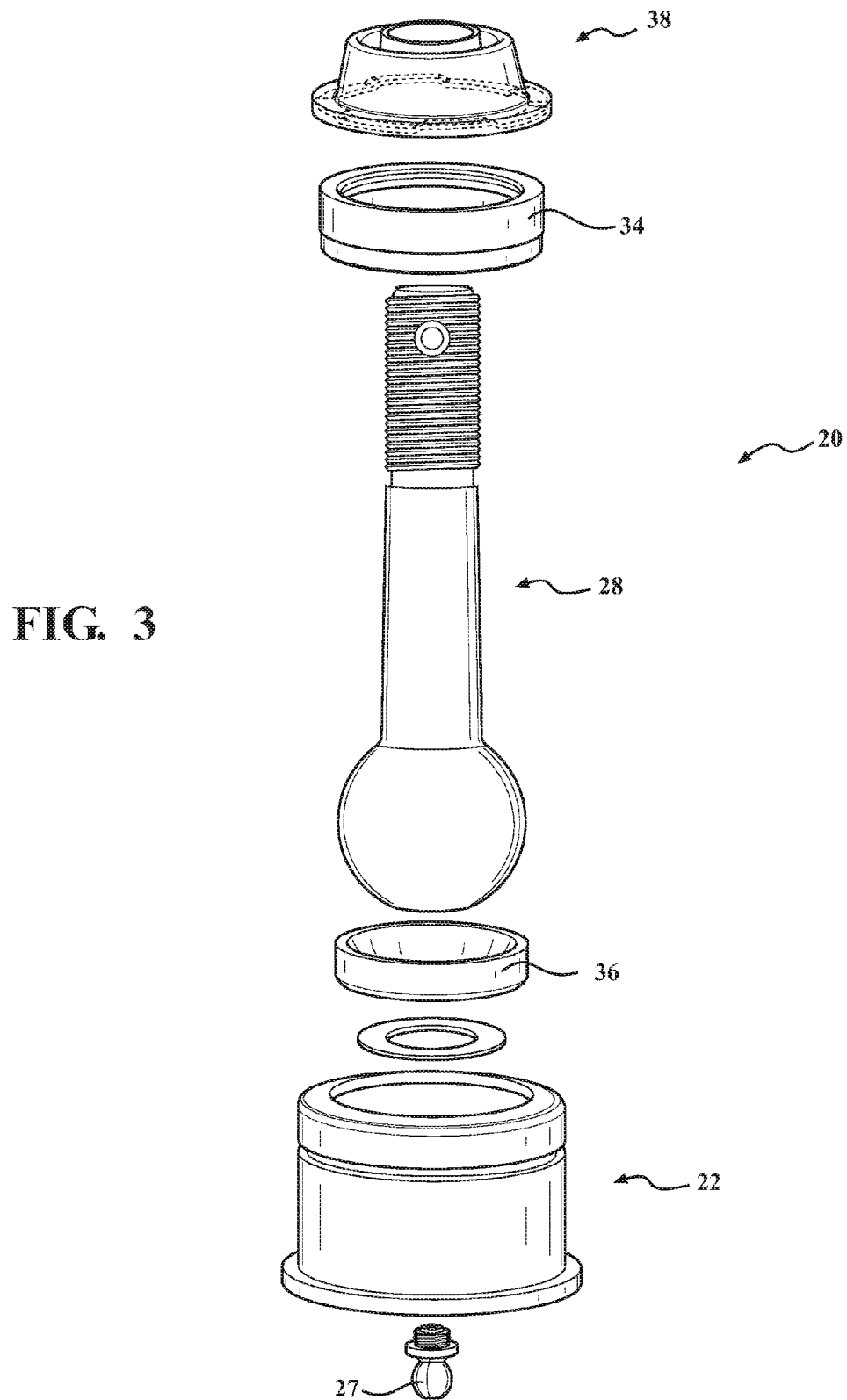
FIG. 3 is a cross-sectional and exploded view of the socket assembly of FIG. 1.

Referring to the Figures, wherein like numerals indicate corresponding parts throughout the several views, an exemplary embodiment of an improved socket assembly 20 is generally shown in FIGS. 1-3. In the exemplary embodiment, the socket assembly 20 is a ball socket assembly 20 which is designed for use in a vehicle suspension system to operatively connect a knuckle (not shown) with a control arm (not shown). However, it should be appreciated that the socket assembly 20 could find uses in a range of different automotive and non-automotive applications.

As shown in FIGS. 2 and 3, the exemplary embodiment of the ball socket assembly 20 includes a housing 22 with an inner surface that defines an inner bore which extends along a central axis A from an open end 24 to a closed end 26. In the exemplary embodiment, the housing 22 has an outer surface which is shaped to be press-fit into an opening of a control arm (not shown). In the exemplary embodiment, a lubricant opening is formed into the closed end 26 of the housing 22, and a Zerk fitting 27 is received into the lubricant opening for channeling a lubricant, such as grease, into the inner bore during initial manufacturing and during routine maintenance of the ball socket assembly 20. The housing 22 is preferably made as a single, monolithic piece of metal, such as steel or an alloy steel, and may be shaped through any suitable process or processes.

The ball socket assembly 20 further includes a ball stud 28 which has a ball portion 30 and a shank portion 32. The ball portion 30 is disposed in the inner bore of the housing 22, and the shank portion 32 projects out of the inner bore through the open end 24. The ball portion 30 has a semi-spherically curved outer surface. The ball stud 28 is preferably made as a single, monolithic piece of metal, such as steel or an alloy steel, and may be shaped through any suitable process or processes.

Upper and lower bearings 34, 36 are received in the inner bore between the inner surface of the housing 22 and the ball portion 30 of the ball stud 28 to permit free rotation and articulation of the ball stud 28 and the housing 22 relative to one another. The bearings 34, 36 have semi-spherically curved bearing surfaces which are in surface-to-surface contact with opposite hemispheres of the outer surface of the ball portion 30 of the ball stud 28. The bearings 34, 36 are preferably made of metal but may be made of any suitable material, including certain plastics. Although the exemplary embodiment includes two bearings 34, 36, it should be appreciated that any suitable number of bearings 34, 36.

The socket assembly 20 further includes a dust boot 38 that is sealed against both the housing 22 and the ball stud 28 to seal a lubricant (such as grease) within the inner bore of the housing 22 and to keep contaminants out of the inner bore. The dust boot 38 includes an elastomeric boot body 40 which extends along the central axis A from a first boot end 42 to a second boot end 44. The first boot end 42 is received in the inner bore of the housing 22 and is in sealed against the inner surface of the housing 22. In the exemplary embodiment, the first boot end 42 is in the shape of a radially outwardly extending flange 42 which has a constant thickness three hundred and sixty (360°) around the central axis A.

Figure 4:
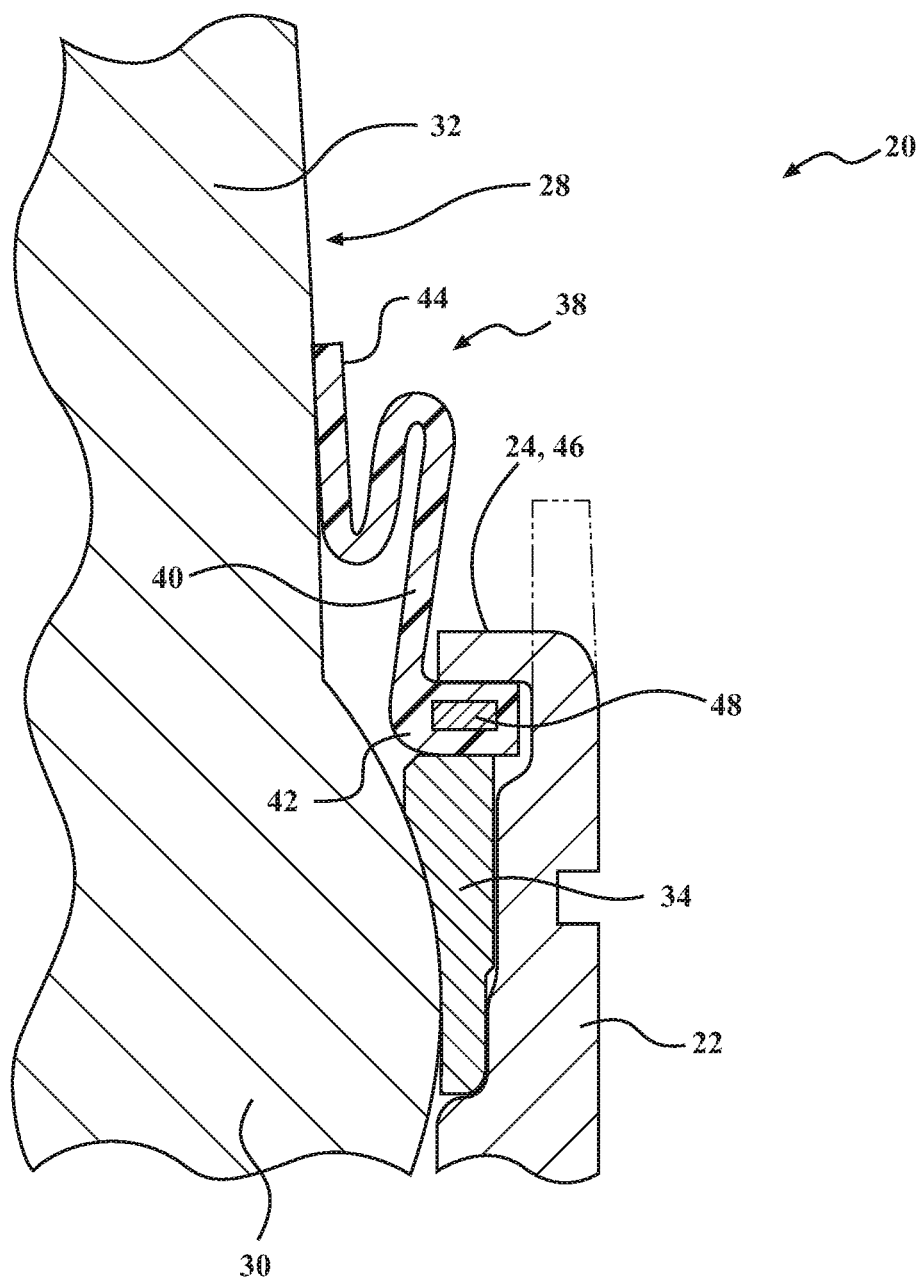
FIG. 4 is an enlarged view of a portion of the socket assembly of FIG. 1 after a swaging operation.
Figure 5:
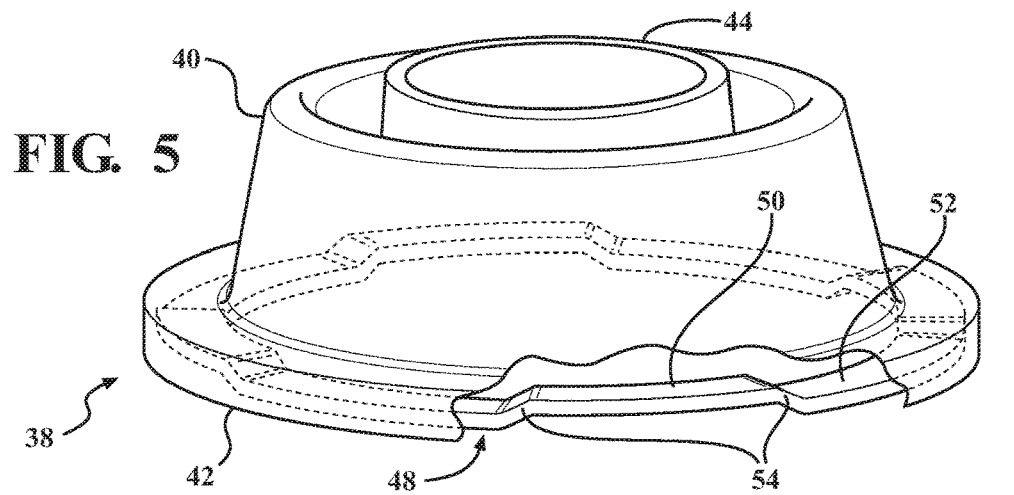
FIG. 5 is a perspective and fragmentary elevation view of a boot of the socket assembly of FIG. 1.
Figure 6:
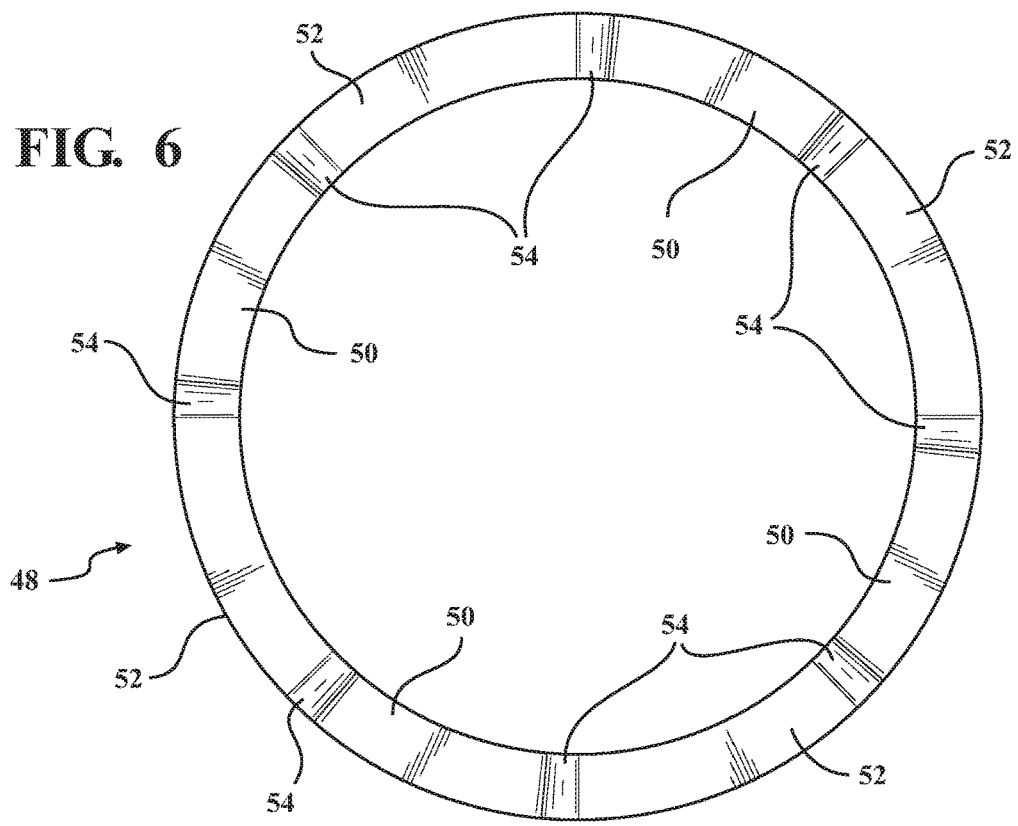
FIG. 6 is a top elevation view of an insert of the boot of FIG. 5.
Figure 7:
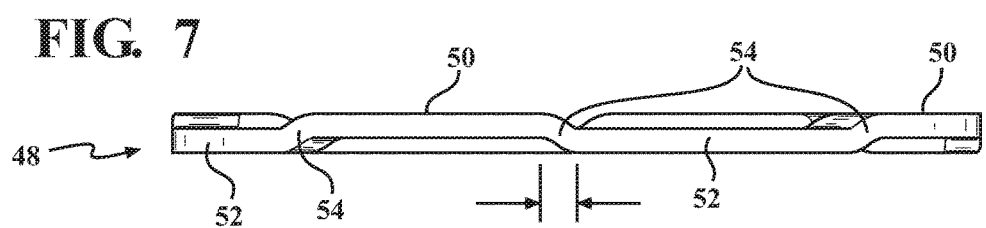
FIG. 7 is a front elevation view of the insert of FIG. 6.

As shown in FIG. 4, a lower surface of the elastomeric boot body 40 is in surface-to-surface contact with an upper face of the upper bearing 34. As also shown in this Figure, an outer edge of the housing 22 is bent, such as through swaging, inwardly towards the central axis A to present a lip 46 which captures the bearings 34, 36, the ball portion 30 of the ball stud 28, and the flange 42 of the elastomeric boot body 40 within the inner bore of the housing 22. As shown, an upper face of the elastomeric boot body 40 is in surface-to-surface contact with a lower surface of the lip 46 to establish the fluid-tight seal between the dust boot 38 and the housing 22.

The elastomeric boot body 40 extends out of the inner bore through the open end 24 of the housing 22, and the second boot end 44 is in surface-to-surface contact with the shank portion 32 of the ball stud 28. The elastomeric boot body 40 is preferably made of Neoprene or any suitable rubber or a rubber-like material capable of elastically flexing to allow the dust boot 38 to maintain the fluid-tight seals with the housing 22 and ball stud 28 as these components rotate and articulate relative to one another during operation of the vehicle.

The dust boot 38 further includes an insert 48 which is in an overmolding engagement with the flange 42 of the elastomeric boot body 40. That is, the insert 48 is inserted into a die cavity, and the elastomeric boot body 40 is molded around the insert 48 such that the insert 48 is at least substantially entirely embedded within the elastomeric material of the flange 42. In the exemplary embodiment, the insert 48 is made as a single, integral piece and has an annular shape that extends continuously around the central axis A. Around the central axis A, the insert 48 extends through a repeating pattern which alternates between a plurality of raised sections 50 and a plurality of recessed sections 52. That is, the raised sections 50 are spaced circumferentially from one another by the recessed sections 52 and vice versa. The raised sections 50 lie in a first common plane, and the recessed sections 52 like in a second common plane which is spaced axially from the first common plane. The insert 48 may be made of either metal or of a polymer-like material that is substantially more rigid than the rubber or rubber-like material of the boot body 40.

The insert 48 also includes a plurality of vertical sections 54 which extend between and interconnect adjacent ones of the recessed and raised sections 52, 50. During the swaging or spinning operation to create the lip 46 which captures the flange 42 of the elastomeric boot body 40 in the inner bore, the vertical sections 54 resist loadings or forces as the lip 46 is formed that are introduced into the flange 42 portion of the boot body 40 to prevent damage to the elastomeric boot body 40.

The vertical sections 54 extend at obtuse angles relative to both the recessed and raised sections 52, 50. That is, in the exemplary embodiment, the vertical sections 54 do not extend straight up and down (axially) between the raised and recessed sections 50, 52. The angles and the circumferential widths of the vertical sections 54 along with the numbers of raised, recessed and vertical sections 50, 52, 54 may be selected to optimize the insert's 48 resistance to the column loads during the swaging or spinning operation. That is, the angles of the vertical sections 54 may be increased to allow more deflection of the insert 48 during the swaging operation or the angles may be reduced to decrease deflection of the insert 48 during the swaging operation.

The pattern of the alternating raised and recessed sections 50, 52 also provides for an extremely strong and durable seal between the elastomeric boot body 40 and the insert 48, thereby eliminating the need for the use of bonding agents to attach these components. Both the upper surfaces of the raised sections 50 and the lower surfaces of the recessed sections 52 are molded within the elastic material of the boot body 40 such that the insert 48 does not directly contact either the lip 46 of the housing 22 or the upper bearing 34. Therefore, at least substantially the entire insert 48 is embedded within the elastomeric material of the flange 42 of the boot body 40. In the exemplary embodiment, the recessed sections 52 of the insert 48 provide areas where the elastic material of the boot body 40 has a substantially greater thickness than that of the material covering the upper surfaces of the raised sections 50. The insert 48 thus controls where the elastic material of the boot body 40 is compressed and where it is not compressed after swaging. If any portion of the elastomeric boot body 40 is cut or damaged during the spinning or swaging operation, the elastomeric material on the opposite side of the insert 48 can retain the fluid-tight seal. Likewise, the inner and outer circumferences of the insert 48 are also molded within the elastic material of the boot body 40.

The primary seal between the dust boot 38 and the housing 22 is the contact between the flange 42 of the elastomeric boot 40 and the upper end face of the upper bearing 34, and the secondary seal between the dust boot 38 and the housing 22 is the contact between the flange 42 portion of the dust boot 38 and a lower surface of the lip 46.

Assembly of the exemplary embodiment of the socket assembly 20 begins with inserting the lower bearing 36 into the inner bore of the housing 22 and then inserting the ball portion 30 of the ball stud 28 into the inner bore to establish surface-to-surface contact between the ball portion 30 and the lower bearing 36. Next, the upper bearing 34 is inserted into the housing 22 to establish surface-to-surface contact between the second bearing and the ball stud 28. Then, the flange 42 of the dust boot 38 is inserted into the inner bore of the housing 22 such that a lower surface of the flange 42 portion directly contacts an upper surface of the second bearing. Next, the open end 24 of the housing 22 is deformed (preferably through swaging or spinning) to present a lip 46 with a lower surface that directly contacts an upper surface of the flange 42 of the dust boot 38, thereby permanently capturing the flange 42, the bearings 34, 36 and the ball portion 30 of the ball stud 28 within the inner bore of the housing 22. That is, the flange 42 is captured by the lip 46 of the housing 22 to both establish the seal between the dust boot 38 and the housing 22 and hold the components in the interior of the housing 22.

Obviously, many modifications and variations of the present invention are possible in light of the above teachings and may be practiced otherwise than as specifically described while within the scope of the appended claims. The use of the terms "upper" and "lower" are in reference to the orientations of the structure in the various drawings and are not intended to be limiting or requiring any specific orientation. Additionally, it is to be understood that all features of all claims and all embodiments can be combined with each other, as long as they do not contradict each other.

What is claimed is:

1. A socket assembly, comprising:
   a housing with an inner bore which extends along a central axis;
   a stud with a first portion that is disposed in said inner bore of said housing and with a shank portion that extends out of said inner bore through an open end of said housing;
   a boot including a boot body that is made of an elastomeric material and that extends from a first boot end to a second boot end, said first boot end being received in said inner bore of said housing and being operatively sealed with said housing, and said second boot end being operatively sealed with said shank portion of said stud;
   said boot further including an insert that is in an overmolding engagement with said first boot end of said elastomeric boot body;
   said insert including a plurality of raised sections that are circumferentially spaced from one another by a plurality of recessed sections and including a plurality of vertical sections that interconnect adjacent ones of said raised and recessed sections; and
   said vertical sections extending axially between adjacent ones of said raised and recessed sections and said vertical sections extending at angles relative to said raised and recessed sections.

2. The socket assembly as set forth in claim 1 wherein said open end of said housing presents a radially inwardly extending lip that captures said first portion of said stud and said first boot end of said boot body within said inner bore of said housing.

3. The socket assembly as set forth in claim 2 wherein said radially inwardly extending lip is bent into said housing.

4. The socket assembly as set forth in claim 2 wherein said angles that said vertical sections extend at are obtuse angles.

5. The socket assembly as set forth in claim 1 further including at least one bearing disposed in said inner bore of said housing and wherein said elastomeric boot body is in surface-to-surface contact with an end face of said at least one bearing to establish a primary seal between said boot and said housing.

6. The socket assembly as set forth in claim 5 wherein said elastomeric material of said boot body is in surface-to-surface contact with said lip of said housing to establish a secondary seal between said boot and said housing.

7. The socket assembly as set forth in claim 6 wherein said raised sections of said insert lie in a common first plane and wherein said recessed sections of said insert lie in a common second plane that is spaced axially from said common first plane.

8. The socket assembly as set forth in claim 1 wherein said insert is made of metal or a rigid plastic material.

9. A method of making a socket assembly, comprising the steps of:
preparing an insert with a plurality of raised sections that are spaced circumferentially from one another by a plurality of recessed sections and with a plurality of vertical sections that interconnect adjacent ones of the raised and recessed sections and wherein the vertical sections extend axially between adjacent ones of the raised and recessed sections and the vertical sections extending at angles relative to the raised and recessed sections;
molding a first boot end of a boot body out of an elastomeric material around at least a portion of the insert and wherein the boot body extends from the first boot end to a second boot end;
inserting a first portion of a stud into an inner bore of a housing such that a shank portion of the stud extends out of the inner bore through an open end of the housing;
inserting the first boot end of the boot body into the inner bore of the housing through the open end;
sealing the first boot end of surface of the housing; and
sealing the second boot end of the boot body with the shank portion of the housing.

10. The method of making a socket assembly as set forth in claim 9 wherein the step of sealing the first boot end of the boot body with the inner surface of the housing is further defined as bending an edge of the housing radially inwardly to present a radially inwardly extending lip which overlies the first boot end of the boot body to capture the first boot end of the boot body and the first portion of the stud in the inner bore of the housing.

11. The method of making a socket assembly as set forth in claim 10 further including the step of inserting at least one bearing into the inner bore of the housing.

12. The method of making a socket assembly as set forth in claim 11 further including the step of sealing the first boot end of the boot body with an end face of the at least one bearing.

13. The method of making a socket assembly as set forth in claim 12 further including the step of establishing surface-to-surface contact between the first boot end of the boot body and the lip of the housing and between the first boot end of the boot body and the end face of the at least one bearing.

14. The method of making a socket assembly as set forth in claim 9 wherein the angles that the vertical sections of the insert extend at are obtuse angles.

15. The method of making a socket assembly as set forth in claim 9 wherein the raised sections of the insert lie in a common first plane and the recessed sections of the insert lie in a common second plane that is spaced vertically from the common first plane.

* * * * *